United States Patent
Kojima et al.

(10) Patent No.: US 11,967,703 B2
(45) Date of Patent: Apr. 23, 2024

(54) POSITIVE ELECTRODE LAYER AND ALL-SOLID-STATE BATTERY

(71) Applicant: Panasonic Intellectual Property Management Co., Ltd., Osaka (JP)

(72) Inventors: Toshiyuki Kojima, Kyoto (JP); Akihiro Horikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 204 days.

(21) Appl. No.: 17/510,472

(22) Filed: Oct. 26, 2021

(65) Prior Publication Data

US 2022/0199973 A1 Jun. 23, 2022

(30) Foreign Application Priority Data

Dec. 23, 2020 (JP) ................. 2020-214117

(51) Int. Cl.
*H01M 4/36* (2006.01)
*H01M 4/02* (2006.01)
*H01M 10/0562* (2010.01)

(52) U.S. Cl.
CPC ....... *H01M 4/364* (2013.01); *H01M 10/0562* (2013.01); *H01M 2004/021* (2013.01); *H01M 2004/028* (2013.01); *H01M 2300/008* (2013.01)

(58) Field of Classification Search
CPC ........... H01M 4/364; H01M 2004/021; H01M 2004/028; H01M 2300/008
See application file for complete search history.

(56) References Cited

U.S. PATENT DOCUMENTS

| | | | | | |
|---|---|---|---|---|---|
| 9,219,272 | B2* | 12/2015 | Lee | ....... | H01M 4/131 |
| 2012/0258358 | A1* | 10/2012 | Yura | ....... | H01M 4/02 |
| | | | | | 429/209 |
| 2016/0308196 | A1* | 10/2016 | Matsubara | ....... | H01M 10/0525 |
| 2019/0088995 | A1* | 3/2019 | Asano | ....... | H01M 10/052 |
| 2019/0190018 | A1* | 6/2019 | Aoki | ....... | H01M 4/366 |
| 2019/0334174 | A1 | 10/2019 | Hasegawa et al. | | |
| 2020/0212479 | A1 | 7/2020 | Kojima et al. | | |

FOREIGN PATENT DOCUMENTS

| | | | | |
|---|---|---|---|---|
| JP | 2014-102911 | | 6/2014 | |
| JP | 2020-109747 | | 7/2020 | |
| KR | 20160040576 | A * | 4/2016 | |
| WO | WO-2017130818 | A1 * | 8/2017 | ...... H01M 10/052 |
| WO | 2017/217079 | | 12/2017 | |
| WO | WO-2018139449 | A1 * | 8/2018 | ...... H01M 10/052 |

(Continued)

OTHER PUBLICATIONS

Machine Translation of WO-2017130818-A1 (Jun. 14, 23) (Year: 2023).*

(Continued)

*Primary Examiner* — Matthew J Merkling
(74) *Attorney, Agent, or Firm* — Wenderoth, Lind & Ponack, L.L.P.

(57) ABSTRACT

Positive electrode layer 20 is used for an all-solid-state battery. Positive electrode layer 20 includes positive electrode active material 2 and solid electrolyte 1. A filling rate of positive electrode layer 20 is 85% or more. A porosity of positive electrode active material 2 is 5% or less.

5 Claims, 3 Drawing Sheets

(56) References Cited

FOREIGN PATENT DOCUMENTS

| WO | 2019/004001 | 1/2019 | |
|---|---|---|---|
| WO | WO-2019150559 A1 * | 8/2019 | ........ H01M 10/0468 |

OTHER PUBLICATIONS

Machine Translation of WO-2018139449-A1 (Jun. 14, 23) (Year: 2023).*
Machine Translation of KR-20160040576-A (Jun. 14, 2023) (Year: 2023).*
Machine Translation of WO-2019150559-A1 (Jun. 14, 2023) (Year: 2023).*

* cited by examiner

POSITIVE ELECTRODE LAYER AND ALL-SOLID-STATE BATTERY

BACKGROUND

1. Technical Field

The present disclosure relates to a positive electrode layer and an all-solid-state battery.

2. Description of the Related Art

In recent years, development of a secondary battery that can be repeatedly used has been required due to weight reduction, cordless extension, or the like of electronic devices such as personal computers and mobile phones. Examples of the secondary battery include a nickel-cadmium battery, a nickel hydrogen battery, a lead-acid battery, and a lithium ion battery. Among these batteries, the lithium ion battery has characteristics such as a light weight, a high voltage, and a high energy density, and thus is attracting attention.

In an automobile field such as an electric vehicle or a hybrid vehicle, the development of a secondary battery having a high battery capacity is important, and a demand for the lithium ion battery tends to increase.

The lithium ion battery is formed of a positive electrode layer, a negative electrode layer, and an electrolyte disposed between the positive electrode layer and the negative electrode layer, and a solid electrolyte or an electrolyte solution obtained by dissolving a supporting salt such as lithium hexafluorophosphate in an organic solvent is used for the electrolyte. Currently, a widely used lithium ion battery is combustible since the electrolytic solution containing the organic solvent is used. Therefore, a material, a structure, and a system for ensuring the safety of the lithium ion battery are required. On the other hand, it is expected that by using a solid electrolyte having flame retardancy as the electrolyte, the material, the structure, and the system described above can be simplified, and it is thought that an energy density can be increased, a manufacturing cost can be reduced, and productivity can be improved. Hereinafter, a battery using the solid electrolyte will be referred to as an "all-solid-state battery".

The solid electrolyte can be roughly divided into an organic solid electrolyte and an inorganic solid electrolyte. In general, as a solid electrolyte to be used for a solid electrolyte layer and a solid electrolyte to be used for forming the positive electrode layer or the negative electrode layer together with an active material, an inorganic solid electrolyte having a high ion conductivity at normal temperature (for example, 25° C.) is mainly used. Examples of the inorganic solid electrolyte include an oxide-based solid electrolyte, a sulfide-based solid electrolyte, and a halide-based solid electrolyte. The ion conductivity of these inorganic solid electrolytes at 25° C. is about $10^{-4}$ S/cm to $10^{-2}$ S/cm. Japanese Patent Unexamined Publication No. 2020-109747 discloses an all-solid-state battery using an inorganic solid electrolyte in a solid electrolyte layer, a positive electrode layer, and a negative electrode layer.

SUMMARY

A positive electrode layer according to an aspect of the present disclosure is a positive electrode layer to be used in an all-solid-state battery, and includes: a positive electrode active material; and a solid electrolyte, in which a filling rate of the positive electrode layer is 85% or more, and a porosity of the positive electrode active material is 5% or less.

DETAILED DESCRIPTION

Figure 1:
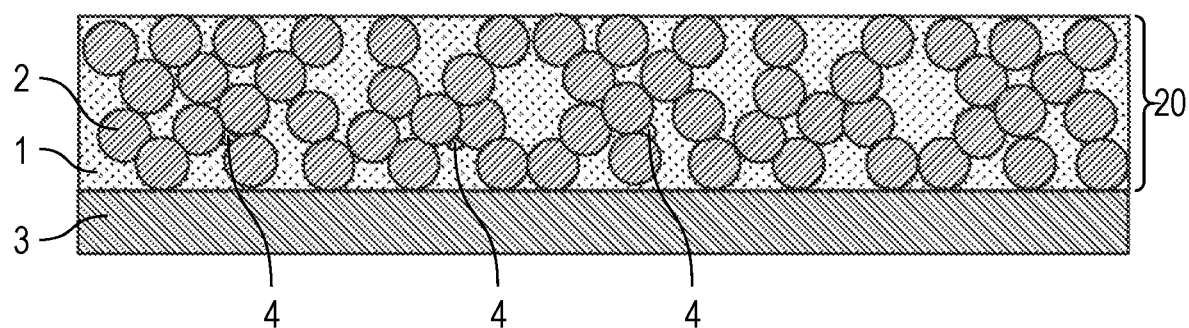
FIG. 1 is a schematic view showing a cross section of a positive electrode layer according to an embodiment.

History of Obtaining One Aspect of Present Disclosure

The positive electrode layer of the all-solid-state battery disclosed in Japanese Patent Unexamined Publication No. 2020-109747 is manufactured through a step in which the positive electrode layer is subjected to high pressure pressing in order to increase a filling rate of the positive electrode layer and to effectively use the positive electrode layer. When the high pressure pressing is not performed, for example, the filling rate of the positive electrode layer is about 70%. On the other hand, when the high pressure pressing is performed, the filling rate of the positive electrode layer is higher than that in a case where the high pressure pressing is not performed, and is, for example, 85% or more.

However, cracks are generated in a positive electrode active material due to the high pressure pressing, and a porosity of the positive electrode active material increases from, for example, 5% or less to about 10%. Thus, the present inventors have found that, when the positive electrode layer is pressed in order to increase the filling rate, there are problems that a conductivity of the positive electrode active material decreases due to the influence of increasing the porosity of the positive electrode active material, and the positive electrode layer cannot be effectively used as a whole.

In the all-solid-state battery, it is necessary to effectively use the positive electrode layer in order to improve battery characteristics. Therefore, the present disclosure has been made in view of the above problems, and provides a positive electrode layer capable of improving the battery characteristics of the all-solid-state battery and an all-solid-state battery using the positive electrode layer. More specifically, the present disclosure provides a positive electrode layer capable of improving the battery characteristics of the all-solid-state battery by preventing a decrease in conductivity of the positive electrode active material.

Overview of Present Disclosure

A positive electrode layer according to an aspect of the present disclosure is a positive electrode layer to be used in an all-solid-state battery, and includes: a positive electrode active material; and a solid electrolyte, in which a filling rate of the positive electrode layer is 85% or more, and a porosity of the positive electrode active material is 5% or less.

Accordingly, since the filling rate of the positive electrode layer is high, an energy density of a battery increases. In addition, since an unfilled portion of the solid electrolyte in the positive electrode layer is small, an area of a bonding surface between the positive electrode active material and the solid electrolyte is also increased, and the positive electrode active material is more effectively used. Therefore, the positive electrode layer can improve a battery capacity of the all-solid-state battery. Further, since the porosity of the positive electrode active material is as low as 5% or less, the conductivity of the positive electrode active material can be kept high. Therefore, the positive electrode layer can improve the battery characteristics of the all-solid-state battery.

For example, the positive electrode active material may include a plurality of spherical particles, and in the plurality of spherical particles, a proportion of the number of particles having an aspect ratio of 1.6 or less to the total number of the particles may be 80% or more. In addition, for example, an average aspect ratio of the plurality of spherical particles may be 1.0 or more and 1.2 or less.

Accordingly, in the plurality of spherical particles constituting the positive electrode active material, the number of particles having a shape close to that of a true sphere is increased, and the filling rate of the positive electrode layer is further increased. Specifically, when the spherical particles have a shape close to that of a true sphere, a surface area per volume of the spherical particles decreases. Therefore, during a manufacturing process of increasing the filling rate of the positive electrode layer such as pressing, the positive electrode active material is prevented from inhibiting a flow of the solid electrolyte. That is, the solid electrolyte is likely to pass through the positive electrode layer, and as a result, the filling rate of the positive electrode layer is increased. Therefore, the positive electrode layer can improve the battery characteristics of the all-solid-state battery.

For example, the solid electrolyte may be a sulfide-based solid electrolyte or a halide-based solid electrolyte.

The sulfide-based solid electrolyte and the halide-based solid electrolyte have a high ion conductivity and are likely to improve the battery characteristics of the all-solid-state battery. In addition, since the sulfide-based solid electrolyte and the halide-based solid electrolyte are more likely to be softened by heating than the oxide-based solid electrolyte, the positive electrode layer can be more highly filled. Therefore, the positive electrode layer can improve the battery characteristics of the all-solid-state battery.

An all-solid-state battery according to an aspect of the present disclosure includes the positive electrode layer.

Accordingly, since the all-solid-state battery includes the positive electrode layer, an all-solid-state battery having improved battery characteristics can be realized.

Thus, the present disclosure provides a positive electrode layer capable of improving battery characteristics of an all-solid-state battery and an all-solid-state battery using the positive electrode layer.

Hereinafter, the present embodiment will be described in more detail.

Each of the embodiments described below shows a comprehensive or specific example. Numerical values, shapes, materials, constituent elements, arrangement positions and connection forms of the constituent elements, steps, and the like described in the following embodiments are examples, and are not intended to limit the present disclosure. Further, among the constituent elements in the following embodiments, constituent elements not recited in any one of the independent claims are described as optional constituent elements.

Each drawing is a schematic view that is appropriately emphasized, omitted, or adjusted in proportion to show the present disclosure, and is not necessarily exactly illustrated and may differ from an actual shape, positional relationship, and ratio. In the drawings, substantially the same components are denoted by the same reference numerals, and redundant description may be omitted or simplified.

In the present specification, a cross-sectional view is a view showing a cross section in a case where a central portion of the positive electrode layer or the all-solid-state battery in a plan view is cut in a lamination direction (thickness direction of each layer).

EMBODIMENT

Positive Electrode Layer

Positive electrode layer 20 for an all-solid-state battery in the present embodiment will be described with reference to FIG. 1. FIG. 1 is a schematic view showing a cross section of positive electrode layer 20 according to the present embodiment. Positive electrode layer 20 in the present embodiment is formed on, for example, positive electrode current collector 3. Positive electrode layer 20 is to be used for an all-solid-state battery, and includes solid electrolyte 1 and positive electrode active material 2. A ratio of solid electrolyte 1 to positive electrode active material 2 is, for example, in a range of 50:50 to 5:95 for the solid electrolyte: the positive electrode active material in terms of weight, and may be in a range of 30:70 to 10:90. This reason is that it is easy to ensure both an ionic conduction path and an electron conduction path in positive electrode layer 20 when the ratio is within the above range. A conductive aid such as acetylene black or Ketjen black (registered trademark) may be added to positive electrode layer 20.

Positive electrode current collector 3 is made of, for example, a metal foil. As the metal foil, for example, a metal foil of stainless steel (SUS), aluminum, nickel, titanium, or copper is used.

Positive electrode layer 20 is highly filled with the material constituting positive electrode layer 20, and specifically, the filling rate of positive electrode layer 20 is 85% or more. Since the filling rate of positive electrode layer 20 is high, the energy density of the all-solid-state battery in which positive electrode layer 20 is used is high.

A main cause of inhibiting the filling of the material constituting positive electrode layer 20 is that unfilled portions 4 of solid electrolyte 1 are present between positive electrode active materials 2. In a case of highly filled positive electrode layer 20, unfilled portions 4 are small in positive electrode layer 20. That is, the area of the bonding surface between positive electrode active material 2 and solid electrolyte 1 also increases, and an electrode reaction between ions and electrons in the vicinity of the bonding surface is likely to occur. As a result, since positive electrode active material 2 is used more effectively, the battery capacity of the all-solid-state battery in which positive electrode layer 20 is used is improved.

The filling rate is a ratio of the volume of the material constituting positive electrode layer 20 to an apparent total volume of positive electrode layer 20, in other words, a total volume of the material constituting positive electrode layer 20 and unfilled portions 4.

Positive Electrode Active Material

Next, details of positive electrode active material 2 will be described. Positive electrode active material 2 includes, for example, a plurality of spherical p articles.

For example, a lithium-containing transition metal oxide is used as the material of positive electrode active material 2 in the present embodiment. Examples of the lithium-containing transition metal oxide include $LiCoO_2$, $LiNiO_2$, $LiMn_2O_4$, $LiCoPO_4$, $LiNiPO_4$, $LiFePO_4$, $LiMnPO_4$, and a compound obtained by substituting the transition metal of the above compounds with one or two different elements. Known materials such as $LiNi_{1/3}Co_{1/3}Mn_{1/3}O_2$, $LiNi_{0.8}Co_{0.15}Al_{0.05}O_2$, and $LiNi_{0.5}Mn_{1.5}O_2$ are used as the compound obtained by substituting the transition metal of the above compounds with one or two different elements. The materials used for positive electrode active material 2 may be used alone or in combination of two or more thereof.

The material of positive electrode active material 2 is used in a form of being molded into, for example, spherical secondary particles having a diameter of 1 μm or more and 100 μm or less by aggregating and granulating a plurality of primary particles. That is, each of the plurality of spherical particles constituting positive electrode active material 2 is, for example, the secondary particle in which a plurality of primary particles are aggregated. When a particle size of the positive electrode active material is miniaturized in order to improve the energy density of the electrode, handleability in an electrode forming step is reduced. Therefore, by granulating a plurality of primary particles finely to about sub-micron and using secondary particles in which the plurality of primary particles are aggregated, positive electrode active material 2 can achieve both improvement in energy density and handleability.

However, positive electrode active material 2 thus formed has a structure in which voids remain between the plurality of primary particles. When positive electrode layer 20 is subjected to high pressure pressing in order to increase the filling rate of positive electrode layer 20, the plurality of secondary particles constituting positive electrode active material 2 are deformed from a spherical shape to a flat shape. Along with the deformation, cracks are generated inside positive electrode active material 2 starting from the voids present before the high pressure pressing, and a void region in positive electrode active material 2 becomes large. That is, the porosity of positive electrode active material 2 increases. Therefore, the conductivity of positive electrode active material 2 decreases.

Here, the positive electrode active material and the positive electrode layer in a comparative example will be described with reference to FIG. 2.

Figure 2:
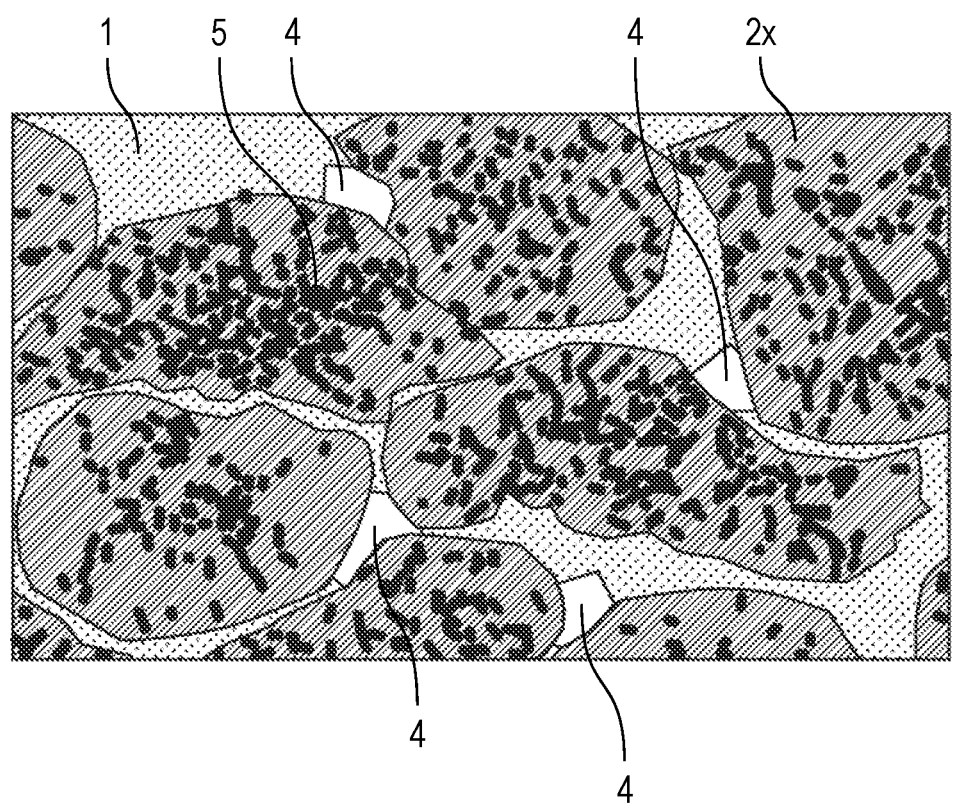
FIG. 2 is an enlarged schematic view showing a cross section of a positive electrode layer according to a comparative example.

FIG. 2 is an enlarged schematic view showing a cross section of the positive electrode layer in the comparative example. The positive electrode layer in the comparative example includes solid electrolyte 1 and positive electrode active material 2x. Positive electrode active material 2x includes a plurality of particles. The plurality of particles are secondary particles obtained by aggregating a plurality of primary particles (not shown) in FIG. 2. Voids 5 are included in positive electrode active material 2x. Voids 5 are voids between the plurality of primary particles, and for example, when positive electrode active material 2x is subjected to high pressure pressing, voids 5 are widened than that before the high pressure pressing.

In the positive electrode layer in the comparative example, unfilled portions 4 of solid electrolyte 1 are present between the plurality of secondary particles constituting positive electrode active material 2.

Next, positive electrode active material 2 and positive electrode layer 20 in the present embodiment will be described in detail with reference to FIG. 3.

Figure 3:
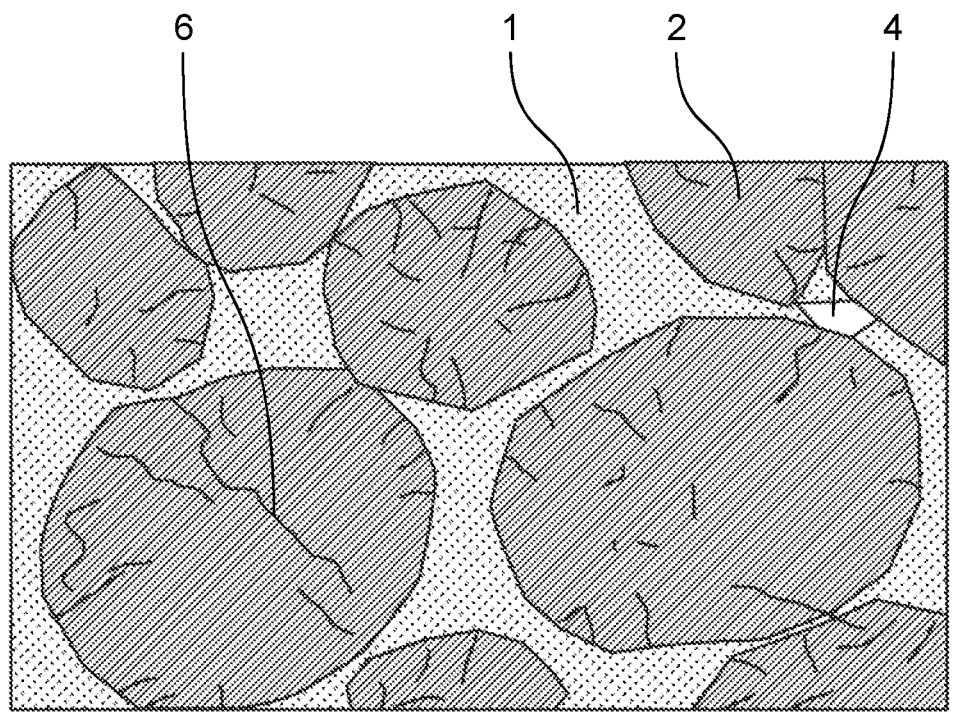
FIG. 3 is an enlarged schematic view showing the cross section of the positive electrode layer according to the embodiment.

FIG. 3 is an enlarged schematic view showing the cross section of positive electrode layer 20 in the present embodiment. As described above, positive electrode layer 20 includes solid electrolyte 1 and positive electrode active material 2. Positive electrode active material 2 includes, for example, a plurality of spherical particles. The plurality of spherical particles constituting positive electrode active material 2 are secondary particles in which the plurality of primary particles (not shown in FIG. 3) are aggregated.

Voids 6 are included inside positive electrode active material 2 including the plurality of secondary particles. Voids 6 are voids between the plurality of primary particles. In the present embodiment, unlike voids 5, voids 6 are the voids that are not widened by the high pressure pressing, and the porosity of positive electrode active material 2 is 5% or less. Accordingly, conduction of electrons inside positive electrode active material 2 is less likely to be inhibited, so that a decrease in conductivity of positive electrode active material 2 can be prevented.

In positive electrode layer 20, unfilled portions 4 of solid electrolyte 1 between the plurality of secondary particles constituting positive electrode active material 2 are smaller than that of the positive electrode layer of the comparative example. This reason is that positive electrode layer 20 is highly filled with solid electrolyte 1, and the filling rate of positive electrode layer 20 is 85% or more. Unfilled portions 4 are voids in positive electrode layer 20 that are not filled with the material constituting positive electrode layer 20.

As described above, in positive electrode layer 20, both prevention of void enlargement in positive electrode active material 2 and high filling of positive electrode layer 20 are achieved. By using such positive electrode layer 20, the battery characteristics of the all-solid-state battery can be improved. In order to manufacture such positive electrode layer 20, for example, the material constituting positive electrode layer 20 is heated, and the material constituting positive electrode layer 20 is subjected to pressing in a state where solid electrolyte 1 is softened. That is, a method of manufacturing positive electrode layer 20 includes a step of increasing the filling rate of positive electrode layer 20 by heat pressing the material constituting positive electrode layer 20. Specifically, in the step of increasing the filling rate, the material constituting positive electrode layer 20 is heat-pressed at a temperature (Celsius) of 60% or more of a melting point (Celsius) of solid electrolyte 1.

When the material constituting positive electrode layer 20 is subjected to pressing in the state where solid electrolyte 1 is not softened, a pressing pressure is directly transmitted in an up-down direction to positive electrode active material 2. As a result, the plurality of secondary particles constituting positive electrode active material 2 are deformed into a flat shape, and the void region in the positive electrode active material is enlarged. On the other hand, when the material constituting positive electrode layer 20 is subjected to pressing in the state where solid electrolyte 1 is softened, fluidity of solid electrolyte 1 is improved, and solid electrolyte 1 is likely to be deformed. Therefore, solid electrolyte 1 passes through the entire periphery of positive electrode active material 2 by the heat pressing, and the pressing pressure is dispersed, so that solid electrolyte 1 is uniformly applied over the entire periphery of the plurality of secondary particles constituting positive electrode active material 2. Therefore, the deformation of the plurality of secondary particles constituting positive electrode active material 2, that is, the enlargement of the region of voids 6 in positive electrode active material 2 can be prevented.

In addition, since solid electrolyte 1 is softened and the fluidity of solid electrolyte 1 is improved, the plurality of secondary particles constituting positive electrode active material 2 are likely to move. Accordingly, since positive electrode active material 2 is filled while being rearranged in the closest packed structure, a high filling effect is enhanced.

Further, since solid electrolyte 1 is softened, the fluidity of solid electrolyte 1 is improved, solid electrolyte 1 easily enters voids in positive electrode active material 2, and the pressing pressure for highly filling positive electrode layer 20 can be reduced. Therefore, by reducing the pressure applied to the plurality of secondary particles constituting positive electrode active material 2, the deformation of the plurality of secondary particles is prevented, and the enlargement of the void region in positive electrode active material 2 is prevented.

An effect of preventing the enlargement of the void region in positive electrode active material 2 by such heat pressing is particularly useful when positive electrode active material 2 is constituted by the plurality of secondary particles which are likely to be deformed since the particles are aggregated particles, but the same effect can be obtained even when positive electrode active material 2 does not contain the secondary particles.

From the viewpoint of further softening solid electrolyte 1 in the step of increasing the filling rate of positive electrode layer 20, the temperature (Celsius) during the heat pressing may be 80% or more of the melting point (Celsius) of solid electrolyte 1. In addition, the temperature (Celsius) of the heat pressing is, for example, 130% or less of the melting point (Celsius) of solid electrolyte 1. Accordingly, deterioration due to heat of solid electrolyte 1 is prevented. In the present specification, the melting point is a melting peak temperature measured by differential scanning calorimetry. For example, when the heat pressing is performed at a temperature of 5% or 40% of the melting point, the enlargement of the void region in the positive electrode active material is confirmed. The temperature during the heat pressing may be equal to or higher than a temperature of an endothermic peak start point in a melting reaction of solid electrolyte 1 measured by the differential scanning calorimetry.

In addition, the temperature during the heat pressing is lower than, for example, a temperature at which a surface composition of the material of the positive electrode active material is changed.

As the pressing method, a known pressing method can be used, and examples thereof include flat pressing, roll pressing, and a method of applying pressure by a confining jig.

The pressing pressure in the step of increasing the filling rate of positive electrode layer 20 is, for example, 100 MPa or more and 1000 MPa or less. When the pressing pressure is 100 MPa or more, the filling rate of positive electrode layer 20 is likely to be increased. In addition, when the pressing pressure is 1000 MPa or less, problems such as cracking of positive electrode active material 2 are prevented. From the viewpoint of further preventing the problems such as the cracking of the material of the positive electrode active material, the pressure during the heat pressing may be 100 MPa or more and 350 MPa or less.

In addition, the method of manufacturing positive electrode layer 20 may include a step of promoting sintering of solid electrolyte 1 in order to improve bonding strength between solid electrolytes 1 and between solid electrolyte 1 and positive electrode active material 2, to further improve the filling rate of positive electrode layer 20, and to reduce a grain boundary resistance of solid electrolyte 1 after the step of increasing the filling rate of positive electrode layer 20. In order to increase the filling rate of positive electrode layer 20, it is important to continue a combination of pressing and heating in the step of promoting the sintering of solid electrolyte 1.

When the pressing pressure and the heating are applied only to the step of increasing the filling rate of positive electrode layer 20, and then in the step of promoting the sintering of solid electrolyte 1, only the heating is performed without applying the pressing pressure, it may not be possible to obtain sufficient improvement in filling rate of positive electrode layer 20. In the step of promoting the sintering, when the pressing pressure is not applied, an effect of filling unfilled portions 4 is obtained only by a sintering force, and the effect of filling unfilled portions 4 is hardly obtained.

In the step of increasing the filling rate of positive electrode layer 20, the pressing pressure and the heating are applied, and further, also in the step of promoting the sintering of solid electrolyte 1, the filling rate of positive electrode layer 20 can be sufficiently increased by applying both the pressing pressure and the heating. Also in the step of promoting the sintering, the filling of solid electrolyte 1 into unfilled portions 4 between the plurality of secondary particles constituting positive electrode active material 2 is promoted by applying the pressing pressure.

The step of increasing the filling rate of positive electrode layer 20 and the step of promoting the sintering of solid electrolyte 1 may be performed as one continuous step.

According to these effects, it is possible to provide positive electrode layer 20 in which the filling rate of positive electrode layer 20 is high and the enlargement of the region of voids 6 in positive electrode active material 2 is prevented.

The pressing pressure in the step of promoting the sintering may be lower than that in the step of increasing the filling rate. The reason is that in the step of increasing the filling rate, an effect of improving the filling rate is obtained by rearranging the materials in positive electrode layer 20, and the pressing in the step of promoting the sintering is to assist an effect of increasing the filling rate of positive electrode layer 20 while sintering solid electrolyte 1. The pressing pressure in the step of promoting the sintering is, for example, in the range of 3 MPa or more and 1000 MPa or less.

In the pressing method in the step of promoting the sintering, for example, the method of applying the pressing pressure by a confining jig is used from the viewpoints of small size and simplicity. The reason is that the step of promoting the sintering is often longer than the step of increasing the filling rate, and it is better to press a plurality of samples at the same time. In the step of promoting the sintering, the pressing method may be the same pressing method as in the step of increasing the filling rate.

As described above, solid electrolyte 1 is easily filled also in the voids between positive electrode active materials 2, unfilled portions 4 of the solid electrolyte are reduced, and the filling rate of positive electrode layer 20 is increased.

In addition, voids 6 in positive electrode active material 2, which are present between the plurality of primary particles of positive electrode active material 2, are also not enlarged. Accordingly, the deterioration of the conductivity of positive electrode active material 2 can be prevented. In the present embodiment, the porosity of positive electrode active material 2 is 5% or less.

The porosity is obtained by dividing a total area of voids 6 in positive electrode active material 2 by the total area of positive electrode active material 2 including voids 6, for example, in a cross-sectional scanning electron microscope (SEM) photograph of positive electrode layer 20.

The plurality of secondary particles constituting positive electrode active material 2 are spherical particles. In the plurality of spherical particles, for example, the proportion of the number of particles having an aspect ratio of 1.6 or less to the total number of the particles may be 80% or more. Accordingly, in the plurality of spherical particles constituting positive electrode active material 2, the number of particles having a shape close to that of a true sphere is increased, and the surface area per volume decreases. Therefore, during the step of increasing the filling rate of positive electrode layer 20, positive electrode active material 2 is prevented from inhibiting the flow of solid electrolyte 1, and solid electrolyte 1 is likely to pass through positive electrode layer 20. As a result, the filling rate of positive electrode layer 20 is likely to be high, and the battery characteristics of the all-solid-state battery using positive electrode layer 20 are improved. From the viewpoint of further increasing the filling rate of positive electrode layer 20, the average aspect ratio of the plurality of spherical particles may be 1.0 or more and 1.2 or less. In addition, since solid electrolyte 1 is softened in the step of increasing the filling rate of positive electrode layer 20, positive electrode layer 20 is manufactured without deforming the plurality of spherical particles constituting positive electrode active material 2 into a flat shape. Therefore, positive electrode layer 20 including the plurality of spherical particles having the above aspect ratio is realized.

The method of determining the proportion of the number of particles having an aspect ratio of 1.6 or less to the total number of the particles is, for example, performed by the following method. First, the cross-sectional SEM photograph of positive electrode layer 20 is taken at a magnification of 3000 times, and the aspect ratio of each of the plurality of spherical particles constituting positive electrode active material 2 taken in the cross-sectional SEM photograph is obtained. The aspect ratio is obtained as a ratio of a long side and a short side of each spherical particle (a numerical value obtained by dividing a length of the short side from a length of the long side) by measuring the lengths of the long side and the short side of each of the plurality of spherical particles. Then, the proportion of the number of particles having an aspect ratio of 1.6 or less to the total number of the particles is obtained by calculating "the number of particles having an aspect ratio of 1.6 or less/the total number of the particles in which the aspect ratio is measured" in the plurality of spherical particles taken in the cross-sectional SEM photograph.

In the method of determining the average aspect ratio of the plurality of spherical particles, the aspect ratio of each spherical particle is determined by the method described above, and the value thereof is averaged.

In the above measurement, at least three or more cross-sectional SEM photographs are taken.

Solid Electrolyte

Next, solid electrolyte 1 will be described in detail. As the material of solid electrolyte 1, for example, an inorganic solid electrolyte is used. Specifically, solid electrolyte 1 is, for example, a sulfide-based solid electrolyte or a halide-based solid electrolyte. Accordingly, the ion conductivity of solid electrolyte 1 is improved, and the battery characteristics of the all-solid-state battery using positive electrode layer 20 are improved. In addition, among the inorganic solid electrolytes having high ion conductivity, the sulfide-based solid electrolyte and the halide-based solid electrolyte are more likely to be softened by heating than the oxide-based solid electrolyte, so that positive electrode layer 20 can be more highly filled, and the battery characteristics of the all-solid-state battery using positive electrode layer 20 can be improved.

The type of the sulfide-based solid electrolyte in the present embodiment is not particularly limited. Examples of the sulfide-based solid electrolyte include $Li_2S$—$Si_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, and $Li_2S$—$P_2S_5$. In particular, since the ion conductivity of lithium is excellent, the sulfide-based solid electrolyte may contain Li, P, and S. The above description of "$Li_2S$—$P_2S_5$" means a sulfide-based solid electrolyte using a raw material composition containing $Li_2S$ and $P_2S_5$, and the same applies to other descriptions.

The halide-based solid electrolyte is a solid electrolyte containing a halide. The halide is, for example, a compound composed of Li, M', and X'. M' is at least one element selected from the group consisting of metal elements other than Li and metalloid elements. X' is at least one element selected from the group consisting of F, Cl, Br, and I. The "metal element" refers to all elements (excluding hydrogen) included in Group 1 to Group 12 in the periodic table, and all elements (excluding B, Si, Ge, As, Sb, Te, C, N, P, O, S, and Se) included in Group 13 to Group 16 in the periodic table. The "metalloid element" represents B, Si, Ge, As, Sb, and Te. For example, M' may include Y (yttrium). Examples of the halide containing Y include $Li_3YC_{16}$ and $Li_3YBr_6$.

All-Solid-State Battery

Figure 4:
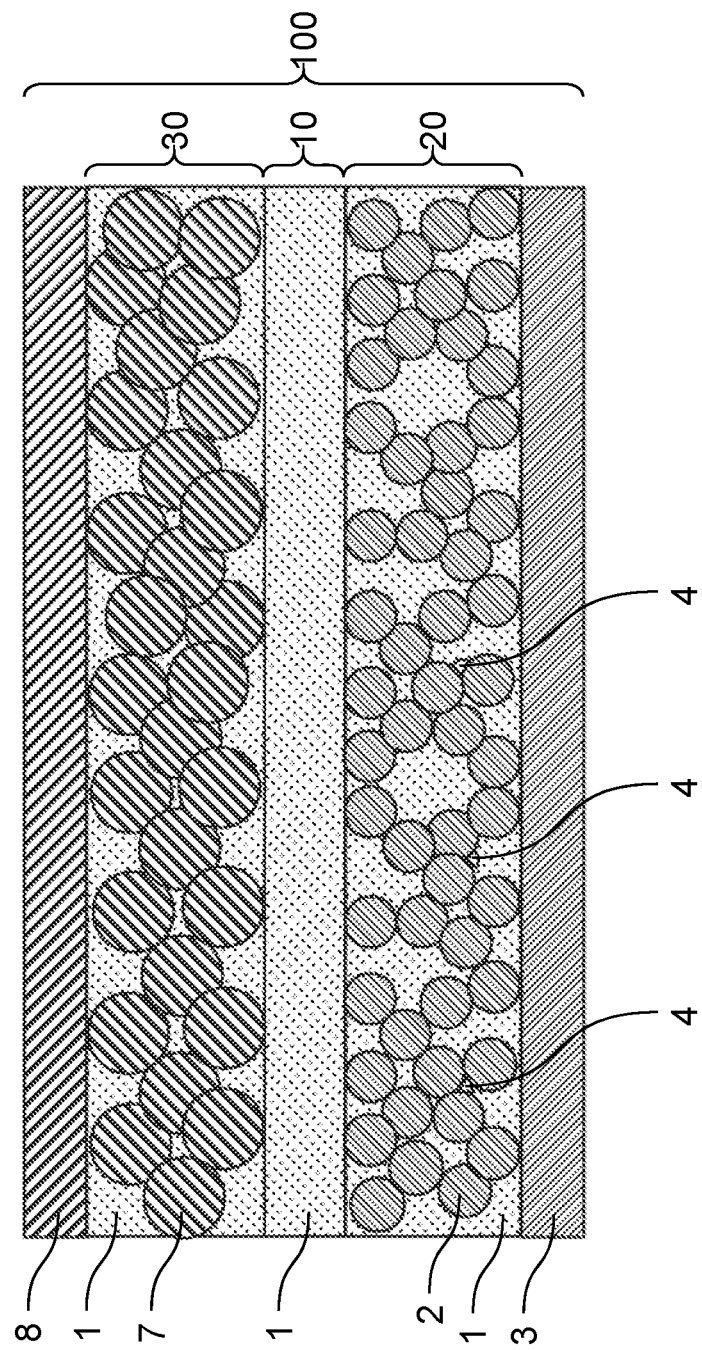
FIG. 4 is a schematic view showing a cross section of an all-solid-state battery according to the embodiment.

Next, the all-solid-state battery including positive electrode layer 20 will be described with reference to FIG. 4. FIG. 4 is a schematic view showing a cross section of all-solid-state battery 100 according to the present embodiment.

All-solid-state battery 100 according to the present embodiment includes positive electrode current collector 3, positive electrode layer 20 formed on positive electrode current collector 3 and containing positive electrode active material 2, negative electrode current collector 8, negative electrode layer 30 formed on negative electrode current collector 8 and containing negative electrode active material 7, and solid electrolyte layer 10 disposed between positive electrode layer 20 and negative electrode layer 30 and containing at least solid electrolyte 1 having ion conductivity. All-solid-state battery 100 has a structure in which positive electrode current collector 3, positive electrode layer 20, solid electrolyte layer 10, negative electrode layer 30, and negative electrode current collector 8 are stacked in this order.

Thus, since all-solid-state battery 100 according to the present embodiment includes the above-described positive electrode layer 20, the battery characteristics of all-solid-state battery 100 are improved.

All-solid-state battery 100 is manufactured, for example, by the following manufacturing method. First, positive electrode layer 20 formed on positive electrode current collector 3 made of a metal foil and containing positive electrode active material 2, negative electrode layer 30 formed on negative electrode current collector 8 made of a metal foil and containing negative electrode active material 7, and solid electrolyte layer 10 disposed between positive electrode layer 20 and negative electrode layer 30 and containing solid electrolyte 1 having ion conductivity are formed. The method for forming negative electrode layer 30 and solid electrolyte layer 10 is not particularly limited, and a known method for forming negative electrode layer 30 and solid electrolyte layer 10 may be used. Then, pressing is performed from outer sides of positive electrode current collector 3 and negative electrode current collector 8 at, for example, 100 MPa or more and 1000 MPa or less, for example, 400 MPa, whereby all-solid-state battery 100 is manufactured.

Negative Electrode Layer

Negative electrode layer 30 in the present embodiment will be described. Negative electrode layer 30 in the present embodiment contains solid electrolyte 1 and negative electrode active material 7, and may further include a binder as necessary. The ratio of solid electrolyte 1 to negative electrode active material 7 is, for example, in a range of 5:95 to 60:40 for the solid electrolyte: the negative electrode active material in terms of weight, and may be in a range of 30:70 to 50:50. It is easy to ensure both the ionic conduction path and the electron conduction path in negative electrode layer 30 when the ratio is within the range. A conductive aid such as acetylene black or Ketjen black may be added to negative electrode layer 30.

As solid electrolyte 1 contained in negative electrode layer 30, for example, solid electrolyte 1 as same solid electrolyte 1 contained in positive electrode layer 20 is used, and therefore description thereof will be omitted. As solid electrolyte 1 contained in negative electrode layer 30, a type of solid electrolyte different from solid electrolyte 1 contained in positive electrode layer 20 may be used.

As the material of negative electrode active material 7, for example, known materials such as an easily alloyed metal with lithium such as indium, tin, and silicon, a carbon material such as hard carbon and graphite, lithium, or $Li_4Ti_5O_{12}$ and $SiO_x$, are used.

As negative electrode current collector 8 made of a metal foil, for example, a metal foil of stainless steel (SUS), copper, or nickel is used.

Solid Electrolyte Layer

Solid electrolyte layer 10 in the present embodiment will be described. Solid electrolyte layer 10 in the present embodiment contains solid electrolyte 1.

As solid electrolyte 1 contained in solid electrolyte layer 10, for example, solid electrolyte 1 same as solid electrolyte 1 contained in positive electrode layer 20 and solid electrolyte 1 contained in negative electrode layer 30 is used, and therefore the description thereof will be omitted. As solid electrolyte 1 contained in solid electrolyte layer 10, a type of solid electrolyte different from solid electrolyte 1 contained in positive electrode layer 20 and solid electrolyte 1 contained in negative electrode layer 30 may be used.

Other Embodiments

The present disclosure is not limited to the above embodiment. The above embodiment is an example, within the scope of the claims of the present disclosure, any object having substantially the same structure as the technical idea and having the same effect and effect is included in the technical scope of the present disclosure. In addition, embodiments in which a person skilled in the art applies various modifications to the embodiments and other forms that are constructed by combining some of the components in the embodiments are also included in the scope of the present disclosure within a range not departing from the gist of the present disclosure.

The positive electrode layer for an all-solid-state battery and the all-solid-state battery according to the present disclosure are expected to be applied to various batteries, such as a power source of a mobile electronic device, or an in-vehicle battery.

What is claimed is:

1. A positive electrode layer to be used in an all-solid-state battery, the positive electrode layer comprising:
    a positive electrode active material; and
    a solid electrolyte, wherein
    a filling rate of the positive electrode layer is 85% or more,
    the positive electrode active material is constituted by secondary particles in which a plurality of primary particles are aggregated,
    voids are included inside the positive electrode active material including the secondary particles and the voids are between the plurality of primary particles,
    a porosity of the voids between the plurality of primary particles of the positive electrode active material is 5% or less,
    the solid electrolyte contains a halide, the halide is a compound composed of Li, M', and X',
    M' is at least one element selected from the group consisting of metal elements other than Li and metalloid elements, and M' refers to all elements excluding B, Si, Ge, As, Sb, Te, C, N, P, O, S, and Se, and
    X' is at least one element selected from the group consisting of F, Cl, Br, and I.

2. The positive electrode layer of claim 1, wherein
    the secondary particles are a plurality of spherical particles, and
    in the plurality of spherical secondary particles, a proportion of the number of particles having an aspect ratio of 1.6 or less to a total number of the particles is 80% or more.

3. The positive electrode layer of claim 2, wherein
    an average aspect ratio of the plurality of spherical secondary particles is 1.0 or more and 1.2 or less.

4. An all-solid-state battery, comprising:
    the positive electrode layer of claim 1.

5. The positive electrode layer of claim 1, wherein
    the halide is $Li_3YCl_6$ or $Li_3YBr_6$.

* * * * *